(12) United States Patent
Grandmougin et al.

(10) Patent No.: US 12,045,032 B1
(45) Date of Patent: Jul. 23, 2024

(54) USING SENSING FUNCTIONS AND ACTUATING FUNCTIONS TO SAFELY IMPLEMENT ACTIONS FOR IoT DEVICES

(71) Applicant: Amazon Technologies, Inc., Seattle, WA (US)

(72) Inventors: Thibaut Pierre Grandmougin, London (GB); Bart Schouwenaars-Harms, Henley-on-Thames (GB)

(73) Assignee: Amazon Technologies, Inc., Seattle, WA (US)

( * ) Notice: Subject to any disclaimer, the term of this patent is extended or adjusted under 35 U.S.C. 154(b) by 922 days.

(21) Appl. No.: 17/039,897

(22) Filed: Sep. 30, 2020

(51) Int. Cl.
*G05B 19/4155* (2006.01)
*G06F 3/06* (2006.01)

(52) U.S. Cl.
CPC ....... *G05B 19/4155* (2013.01); *G06F 3/0604* (2013.01); *G06F 3/0655* (2013.01); *G06F 3/067* (2013.01); *G05B 2219/34038* (2013.01)

(58) Field of Classification Search
CPC ...... G05B 19/4155; G05B 2219/34038; G06F 3/0604; G06F 3/0655; G06F 3/067
USPC .......................................................... 700/28
See application file for complete search history.

(56) References Cited

U.S. PATENT DOCUMENTS

| | | | |
|---|---|---|---|
| 6,968,905 B2 | 11/2005 | Adnan et al. | |
| 8,843,241 B2 | 9/2014 | Saberi et al. | |
| 2009/0225879 A1* | 9/2009 | Kloos | H04L 5/0048 375/260 |
| 2022/0084692 A1* | 3/2022 | Wengrovitz | H04L 67/02 |

* cited by examiner

*Primary Examiner* — Mohammad Ali
*Assistant Examiner* — Saad M Kabir
(74) *Attorney, Agent, or Firm* — Robert C. Kowert; Kowert, Hood, Munyon, Rankin & Goetzel, P.C.

(57) ABSTRACT

An IoT gateway at a client site uses sensing functions and actuating functions to safely implement actions for equipment. The client provides, to the IoT service, specifications for a sensing function and one or more actuating functions that are to communicate with the sensing function. The functions are deployed to the IoT gateway at the client site. The sensing function may be assigned read only access to the equipment and the actuating function may be assigned write only access to the equipment. The sensing function may collect data from the equipment and determine that a condition has been met (e.g., temperature is above an upper limit). In response, the sensing function provides an indication of an action to the actuating function (e.g., via a unique topic). If the action is a supported action, then the actuating function causes the equipment to perform the action; otherwise, it ignores the indicated action.

20 Claims, 6 Drawing Sheets

USING SENSING FUNCTIONS AND ACTUATING FUNCTIONS TO SAFELY IMPLEMENT ACTIONS FOR IoT DEVICES

BACKGROUND

The Internet of Things (IoT) is a phrase given for the interconnection of computing devices scattered around the globe within the existing internet infrastructure. Clients of a remote service provider may leverage the internet-based connectivity of IoT devices by using a service offered by the service provider. For example, a temperature sensor installed on a machine at a client site may collect temperature values and transmit them to the service provider for analysis. The client may also download software from the service provider and install the software on the client's network for use with IoT devices.

A client may use applications to communicate with an IoT device to obtain information from the device or to cause the device to perform actions. For example, client may wish to use an application to read temperature values from a machine that handles products on an assembly line. The client may also want the application to cause the machine to perform various actions, depending on conditions of the machine. For example, the client may wish to cause the machine to shut down when the temperature is too high (e.g., writing a command to the machine to shut down). Due to a coding-related mistake or a processing error, an IoT application might cause an undesirable action. For example, a mistake might occur that causes the application to inadvertently perform a write command to shut down a machine. Such mistakes can lead to various undesirable outcomes, such as losing production time or even damaging a machine.

Figure 1:
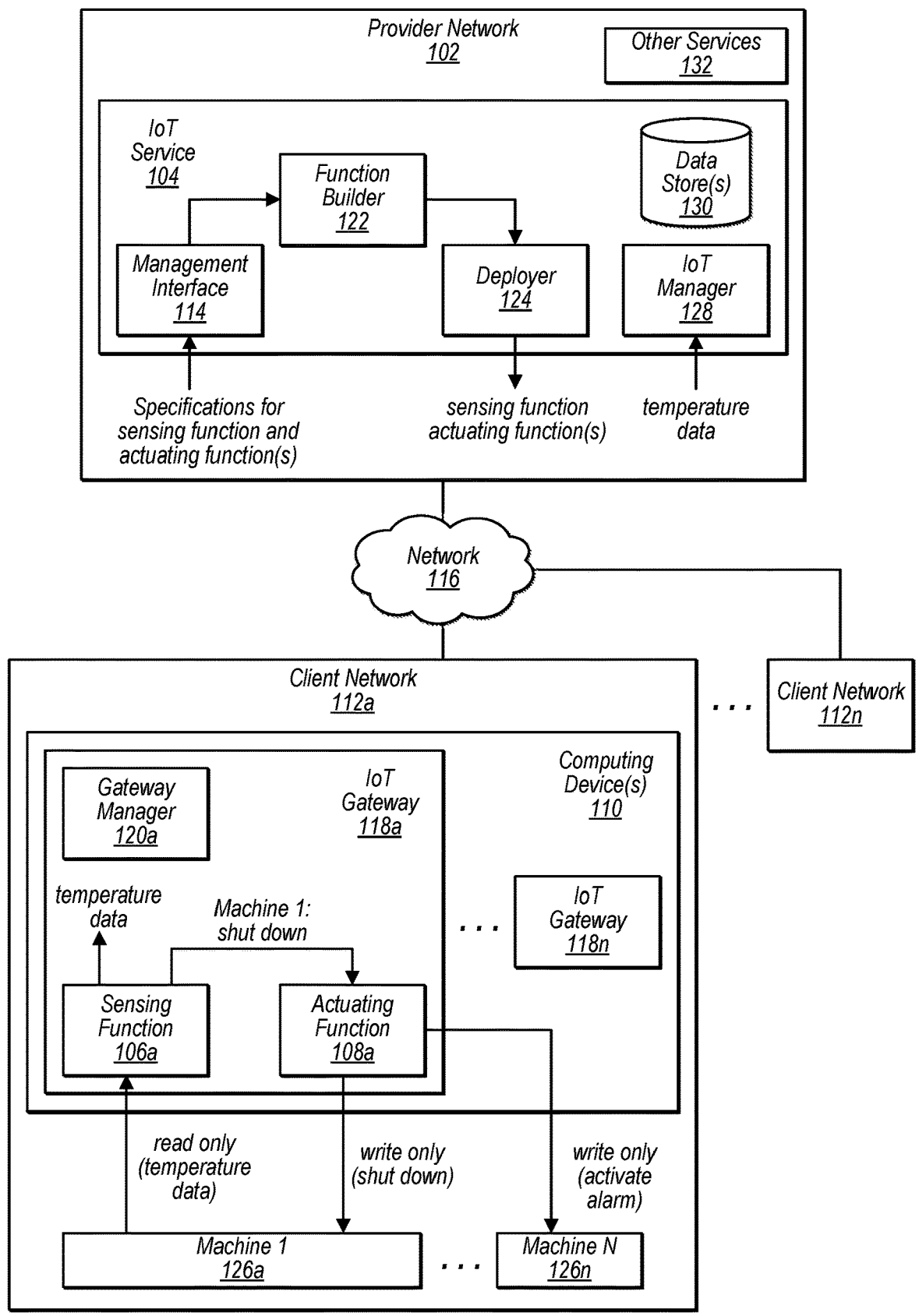
FIG. 1 is a logical block diagram illustrating a system for using sensing functions and actuating functions to safely implement actions for IoT devices, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to use sensing functions and actuating functions to safely implement actions for IoT devices, according to some embodiments. In embodiments, assigning read access to an IoT device to a sensing function and assigning write access to the IoT device to an actuating function enables complete separation between the read and write feature, minimizing the risk for inadvertently performing a write command that results in an undesirable action. Using traditional techniques, a mistake or error may occur that causes an IoT application to inadvertently perform a write command to shut down a machine. By reducing or eliminating such mistakes or errors, the utilization of an IoT device may be improved (e.g., avoiding the loss of production time and/or avoiding damage to the IoT device).

In embodiments, an IoT device (also referred to herein as a "machine" or "equipment") may be any type of device capable of communicating (using a wired and/or wireless connection) with another device on the same or a different network (e.g., on the same local network or a remote network). As used herein, the term "IoT device" and the term "machine" and the term "equipment" may be used interchangeably.

In various embodiments, a machine (IoT device or equipment) may include any number of data sources that provide the same and/or different type of data collected, sensed, and/or measured (e.g., environmental measurements at or near the machine, physical conditions of the machine or different portions of the machine, parts of the machine that have failed, etc.). For example, a machine on an assembly line may include two temperature sensors and three pressure sensors and therefore, at any given time, may communicate up to two temperature values and up to three pressure values to one or more other devices. In embodiments, machine may also (or instead) include any number of data/command receivers that accept the same and/or different type of data from another device (e.g., to cause the machine to perform actions). For example, the machine may also include two heaters and a valve and therefore may receive a command to turn on/off either heater or to open/close the valve.

In some embodiments, any suitable communication protocols may be used for transmitting data between devices and/or networks (e.g., provider network, client networks, computing devices, machines, etc.). For example, MQTT (message queuing telemetry transport) or HTTP (hypertext transfer protocol may be used. In various embodiments, any suitable security communication protocols may be used (e.g., instead of or in conjunction with the above communication protocols) to protect data that is being sent between any devices and/or networks (e.g., provider network, client networks, computing devices, machines, etc.) based on service credentials and/or local credentials (e.g., one or more encryption keys or x.509 certificates) according to asymmetric and/or symmetric encryption techniques. For example, data of messages may be encrypted using SSL (secure socket layer), TLS (transport layer security), HTTPS (secure hypertext transfer protocol), and/or any other suitable network security protocol.

In embodiments, an IoT service and/or IoT gateway provides a framework that allows actions to be safely implemented for IoT devices. The framework may rely on functions (e.g., event-triggered functions) to be pushed to the edge (e.g., client network) using an IoT gateway. The functions may communicate with each other using unique topics that are provisioned within the IoT gateway. Two type of functions may be defined within the framework: sensing functions perform that perform continuous read actions only (from machines/IoT devices) and actuating functions that perform write actions only (to machines/IoT devices) when invoked.

In some embodiments, a sensing function may be used to establish a connection with a single machine/IoT device (1-to-1 relationship). Multiple machines/devices may require multiple sensing functions. A sensing function's inbound topic may be from the cloud only (e.g., via a framework defined configuration payload that specifies connectivity parameters and parameter collection). Sensing function outbound topics may be to the cloud (e.g., as a data stream) and to all (or some) actuating functions of the IoT gateway.

In an embodiment, an actuating function may be used to establish a connection with a single machine/device (1-to-1 relationship). Multiple machines/devices may require multiple actuating functions. An actuating function's inbound topic may be from the cloud (e.g., via a framework defined configuration payload that specifies connectivity parameters and support actions) and from all (or some) sensing functions of the IoT gateway.

At the time of specifying a sensing function, the framework (IoT service) may provide/display to a user a list of unique topics to invoke actuating functions. Sensing functions and actuating functions may need to be initialized. In some embodiments, this is done by posting a JavaScript object notation (JSON) configuration as per the framework schema. When specifying a configuration for a sensing function, the user may specify the any number of parameters to be monitored (e.g., from a machine). A parameter may be associated with one or more actions. For example, a temperature parameter may be given a condition (greater than X degrees Celsius) and two actions (e.g., post shutdown command to equipment A, post start command to equipment B).

In embodiments, any number of actions based on collected data/parameters may be provided. When specifying a configuration for an actuating function, the user may specify the inbound topic and associated actions that are supported by the machine/IoT device. For example, two different machines may need to be configured: one of them to accept a shutdown and the other to accept a start alarm command. In embodiments, a framework enables safe operations on equipment at the edge by requiring explicit listing of actions a sensing function can attempt, actions an actuating function can support, and/or a unique topic to carry the action (e.g., via function specification provided by a user.).

In some embodiments, access to certain topics may be restricted to only a subset of users/developers that have a higher level of access than other users/developers. In embodiments, access to a provisioning topic for actuating functions may be restricted (e.g., by the IoT service/interface). A less experienced user may want to add an action to restart a machine (by updating the action in a sensing function configuration). However, this will not take effect because the corresponding actuating function will not accept this action/command, even though it may receive it from the sensing function.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 6 and described below.

This specification begins with a description of a system for using sensing functions and actuating functions to safely implement actions for IoT devices. A number of different methods and techniques to use sensing functions and actuating functions to safely implement actions for IoT devices are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for using sensing functions and actuating functions to safely implement actions for IoT devices, according to some embodiments.

In the depicted embodiment, a provider network 102 includes an IoT service 104 that may generate and deploy any number of sensing functions 106 and actuating functions 108 to one or more computing devices 110 of a client network 112. In embodiments, any number of different clients of the provider network 102 may use sensing functions and actuating functions to safely implement actions for IoT devices at their own client network 110 (in the same or similar way as described for the client network 110*a*).

The IoT service 102 includes a management interface 114 that may receive specifications for a sensing function and one or more actuating functions to be used with the sensing function (e.g., via an application programming interface (API)). For example, a user or administrator may use a computing device of the client network to provide specifications (e.g., via a user interface such as a graphical user interface or command line), which are transmitted via a wide area network 116 (e.g., the internet) to the IoT service of the provider network. In embodiments, any number of client networks 112 may communicate with the IoT service of the provider network via the network 116.

In the depicted embodiment, the IoT service deploys the IoT gateway 118 to the one or more computing devices 110 before any sensing functions or actuating functions are deployed/provisioned. In embodiments, the IoT gateway 118 may provide an environment or framework to execute sensing functions and actuating functions.

As shown, the IoT gateway includes a gateway manager 120. The gateway manager may manage communication between components of the IoT gateway and the IoT service. For example, the gateway manager may collect temperature data from the sensing function 106 and forward it to the IoT service for analysis.

Returning to the IoT service, the function builder 122 may build (generate) the sensing function and one or more actuating functions based on the received specifications. The deployer 124 may then deploy the sensing function and one or more actuating functions to the IoT gateway 118.

In the depicted embodiment, the client network may include any number of machines 126. As shown, the sensing function 106a is configured for read only access to machine 1 126. The sensing function 106a obtains (reads) temperature data from one or more sensors of the machine (e.g., a series of temperature values collected over time). Some or all of the temperature data may be provided to the gateway manager 120 and forwarded on to the IoT manager 128 of the IoT service. The IoT manager may process the data and/or send some or all of the received data to one or more data stores 130. In some embodiments, the IoT manager may forward some or all of the data to one or more other services 132 of the provider network for processing.

In embodiments, the sensing function determines, based on the data read from machine 1, whether a pre-defined condition has been met (e.g., an administrator or machine operator may define the condition as one or more temperature values are greater than 100 degrees Celsius). If so, then the sensing function provides, to the actuating function, an indication of an action for the machine (shut down). In embodiments, the sensing function may provide any number of indications of actions to the actuating function (e.g., return actuators to a default position and then shut down). As shown, the sensing function 108a is configured for read only access to machine 1 126.

In various embodiments, the condition that results in providing an indication of an action to a machine may be any type of pre-defined condition that is based on the data read from the machine (e.g., based on one or more values read from the machine at a point in time or over a particular period of time). For example, if two or more temperature values read from the machine within a 10 minute time window are below 50 degrees Celsius, then a pre-defined condition has been met and an action is sent to an actuating function. As another example, if an average temperature of 100 temperature values collected over an hour is outside of a particular temperature range, then a pre-defined condition is met and a corresponding action is sent to an actuating function.

In embodiments, one or more calculations may be performed on one or more values of data that are read from the machine to generate one or more results (e.g., an average value, minimum value, maximum value, etc.), and a pre-defined condition may be met if the one or more results are a particular value or fall within a range of values (or outside of a range of values). Therefore, a condition may be met or not met based on one or more results of one or more calculations performed on data read from a machine.

The actuating function receives the indication of the action(s) and determines whether the indicated action(s) is one of the supported actions for the machine. If so, then the actuating function causes the machine to perform the action(s). As shown, the actuating function writes a command to machine 1 to shut down. If the indicated action is not one of the supported actions for the machine, then the actuating function may ignore the indicated action and/or provide, to a destination, an indication that the action is not a supported action for the machine. Verifying that an action is supported by the actuating function before commanding the machine to perform the action may by useful because it can prevent undesired actions to be performed.

As shown, the actuating function may also cause machine N to perform the same action or a different action (e.g., by writing a command to machine N to activate an alarm or to perform any other action). In embodiments, an actuating function may cause any number of machines to perform the indicated action and/or a different action in response to receiving, from a sensing function, an indication of the action. Moreover, in various embodiments, when a condition is met, a sensing function may send an indication of any number of actions to any number of machines. For example, FIG. 2 shows a sensing function that sends indications of two different actions to two different machines.

In embodiments, a higher level of access or authorization may be required for a developer to build an actuating function than to build a sensing function. This may provide an additional level or layer of security that prevents certain actions from being performed.

Figure 2:
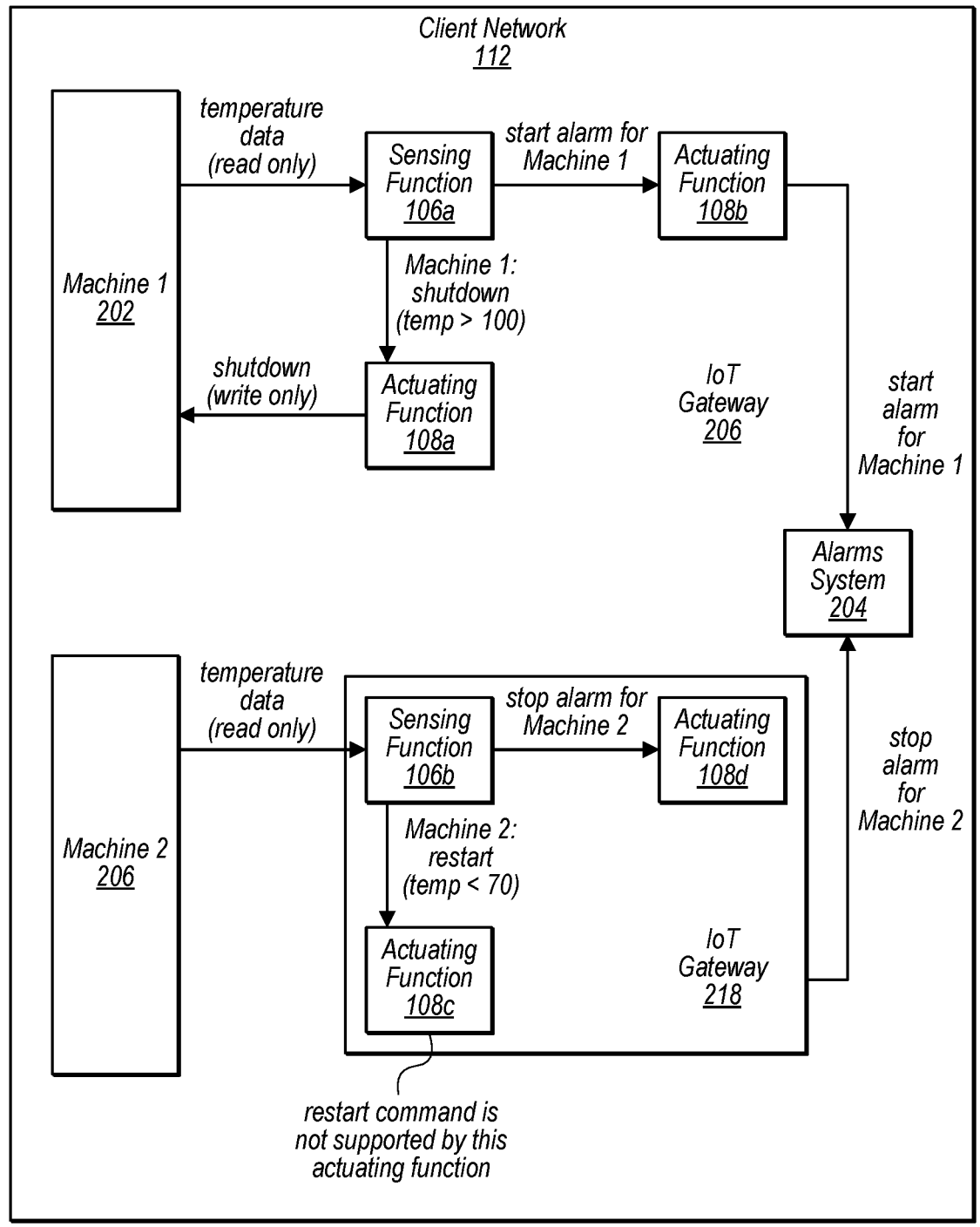
FIG. 2 is a logical block diagram illustrating a different IoT gateways that use sensing functions and actuating functions to safely implement actions for IoT devices, according to some embodiments.

FIG. 2 is a logical block diagram illustrating a different IoT gateways that use sensing functions and actuating functions to safely implement actions for IoT devices, according to some embodiments.

In the depicted embodiment, two gateways 118 have been deployed/provisioned on one or more computing devices 110 of a client network 112. The gateway 118a includes the sensing function 106a, an actuating function 108a, and another actuating function 108b. The sensing function 106a and the actuating function 108a communicate with machine 1 202 and the actuating function 108b communicates with an alarms system 204 (another machine).

As shown, the gateway 118b includes the sensing function 106b, an actuating function 108c, and another actuating function 108d. The sensing function 106b and the actuating function 108c communicate with machine 2 206 and the actuating function 108d communicates with the alarms system 204.

When one or more of the temperature values exceeds a predefined threshold (100 degrees), the sensing function 106a provides, to the actuating function 108a, an indication of an action to shut down machine 1 202, and the sensing function 106a provides, to the actuating function 108b, an indication of an action to start an alarm for machine 1 202.

In response to receiving the action to shut down machine 1, the actuating function 108a determines whether the action is supported. In response to determining that the action is supported, the actuating function 108a sends a command to machine 1 to shut down. In response to receiving the action to start the alarm for machine 1, the actuating function 108b determines whether the action is supported. In response to determining that the action is supported, the actuating function 108b sends a command to the alarms system 204 to start the alarm for machine 1.

As depicted, when one or more of the temperature values falls below a predefined threshold (70 degrees), the sensing function 106b provides, to the actuating function 108c, an indication of an action to restart machine 2 206, and the sensing function 106b provides, to the actuating function 108d, an indication of an action to stop an alarm for machine 2 206.

In response to receiving the action to restart machine 1, the actuating function 108c determines whether the action is supported. In response to determining that the action is not supported, the actuating function 108a ignores the received action and/or provide, to a destination, an indication that the action is not a supported action for the machine. In various embodiments, verifying that an action is supported by the actuating function before commanding machine 1 to perform the action may prevent undesired actions to be performed.

In embodiments, in response to receiving the action to stop the alarm for machine 2, the actuating function 108d determines whether the action is supported. In response to determining that the action is supported, the actuating function 108b sends a command to the alarms system 204 to stop the alarm for machine 2. In some embodiments, the gateways (including the sensing functions, actuating functions, and any other gateway components) may be deployed onto one or more computing devices locally (e.g., from a storage device of the local network) and then installed/provisioned, whereas in other embodiments, the gateways may be deployed onto one or more computing devices from an IoT service and then installed/provisioned.

Figure 3:
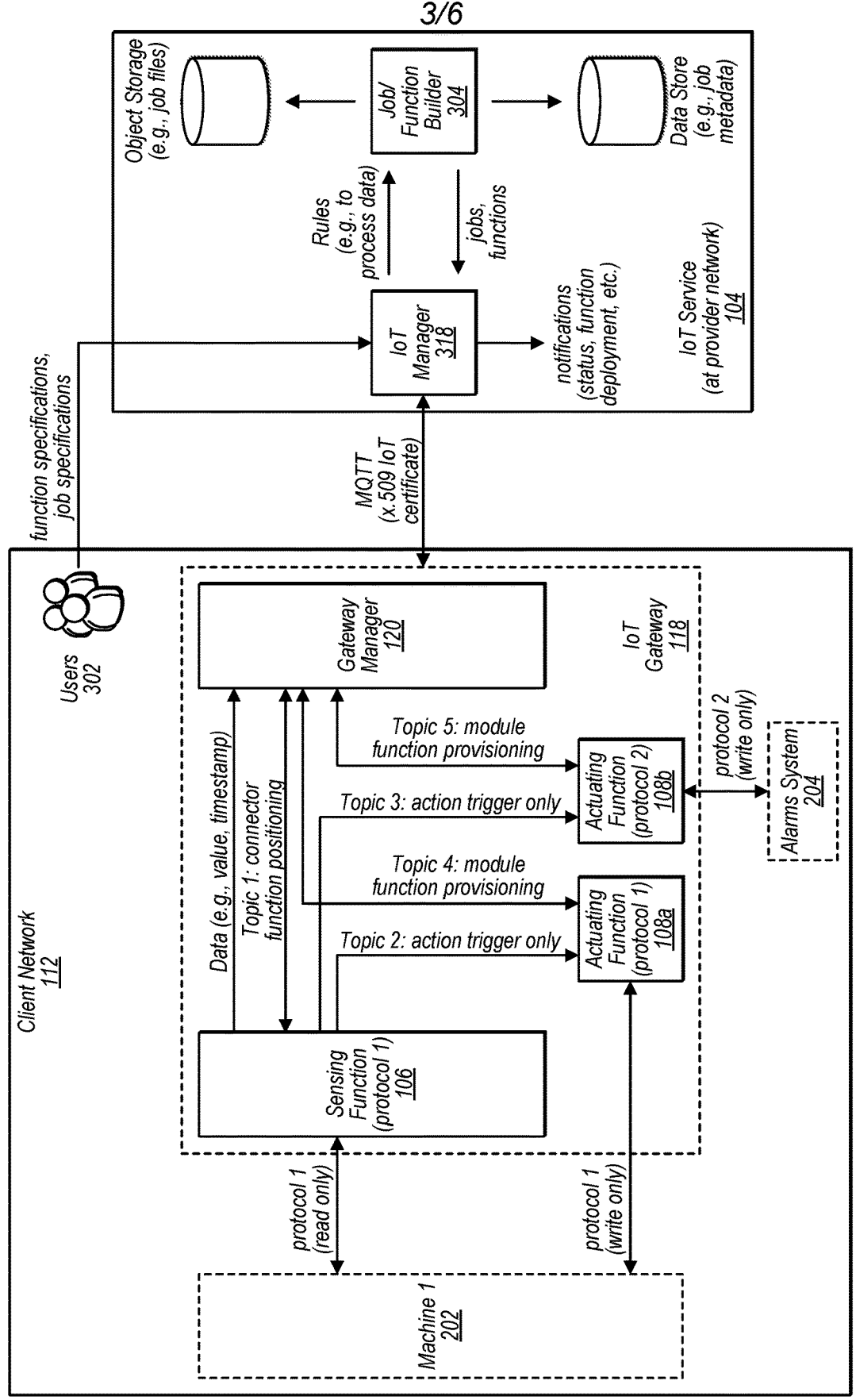
FIG. 3 is a logical block diagram illustrating a system for using sensing functions and actuating functions to safely implement actions for IoT devices, according to some embodiments.

FIG. 3 is a logical block diagram illustrating a system for using sensing functions and actuating functions to safely implement actions for IoT devices, according to some embodiments.

In the depicted embodiment, an IoT service 104 deploys a gateway 118 to the client network 112. One or more users may provide, to a management interface and/or to an IoT manager of the IoT service, specifications of a sensing function 106, an actuating function 108a, and an actuating function 108b. In the depicted embodiment, the IoT manager sends the specifications to a job/function builder 304, which builds the functions and sends them back to the IoT manager. The IoT manager then deploys the functions to the gateway 118.

In the depicted embodiment, to deploy the functions, the gateway manager may receive the functions from the IoT manager and then provision/install them using different topics. As shown, the gateway manager may provision/install the sensing function 106 by providing (e.g., publishing) the sensing function 106 to Topic 1. Similarly, the gateway manager may provision/install the actuating function 108a by providing (or publishing) the actuating function 108a to Topic 4. The gateway manager may also provision/install the actuating function 108b by providing (e.g., publishing) the actuating function 108b to Topic 5.

As shown, the sensing function 106 and the actuating function 108a are provisioned to communicate with machine 1 using protocol 1. However, the actuating function 108b is provisioned to communicate with the alarms system 204 using protocol 2, which is a different protocol than protocol 1.

When the sensing function determines, based on the data collected from machine 1, that a condition has occurred (e.g., temp >100), it provides (e.g., publishes) an indication of the action associated with the condition (e.g., shut down machine 1) to Topic 2 and it also provides (e.g., publishes) an indication of the action associated with the condition (e.g., start alarm) to Topic 3.

In response to determining that the indication of the action was provided to Topic 2, the gateway 118 may invoke (e.g., execute) the actuating function 108a. The invoked actuating function 108a may determine the action that was provided to Topic 2. If the actuating function determines that the action is supported, then the actuating function writes a command to machine 1 according to protocol 1 to perform the action. Therefore, providing the indication of the action to Topic 2 triggers execution of the actuating function 108a. In embodiments, an event listener of the gateway may listen (e.g., subscribe) to Topic 2 and in response to determining that the indication of the action was provided to Topic 2, the event listener may invoke (e.g., execute) the actuating function 108a.

In response to determining that the indication of the action was provided to Topic 3, the gateway 118 may invoke (e.g., execute) the actuating function 108b. The invoked actuating function 108b may determine the action that was provided to Topic 3. If the actuating function determines that the action is supported, then the actuating function writes a command to the alarms system according to protocol 2 to perform the action. Therefore, providing the indication of the action to Topic 3 triggers execution of the actuating function 108b. In embodiments, another event listener of the gateway may listen (e.g., subscribe) to Topic 3 and in response to determining that the indication of the action was provided to Topic 3, the event listener may invoke (e.g., execute) the actuating function 108b. As depicted, the sensing function 106 has read only access to machine 1, the actuating function 108a has write only access to machine 1, and the actuating function 108b has write only access to the alarms system 204.

In the example embodiment, the IoT service communicates with the IoT gateway using the MQTT communication protocol (using an x.509 certificate). For example, temperature values of machine 1 may be collected by the sensing function, associated with respective timestamps, sent to the gateway manager along with an x.509 certificate assigned to machine 1, and then transmitted to the IoT service according to the MQTT protocol. The IoT service may authenticate the received data based on the certificate assigned to machine 1 and then process the data according to one or more rules. The data may be stored in one or more data stores.

In embodiments, a user may also send a specifications for a job to the IoT service (e.g., a job to collect and process temperature data from machine 1 for a certain time period). The IoT service may send the specifications to the job/function builder 304, which builds the job and sends the job back to the IoT manager for scheduling and execution. As shown, job metadata may be stored at a data store and various job files may be stored to an object storage data store. In embodiments, the IoT manager 128 may provide notifications of job status or functions that have been deployed.

In some embodiments, to generate a given sensing function to communicate with a machine, the IoT service assigns, to the sensing function, read only access to the machine according to a communication protocol of the machine. In embodiments, to generate a given actuating function to communicate with the same machine, the IoT service assigns, to the actuating function, write only access to the machine according to a communication protocol of the machine.

In various embodiments, an actuating function may be invoked based on a topic. For example, in order to provide, to the actuating function, an indication of an action for the machine, a sensing function may provide the indication of the action to a topic uniquely assigned to the actuating function. In response to the providing of the indication of the action to the topic, an event listener running within the IoT gateway may invoke the actuating function. The actuating function may then determine, based on the topic, the indicated action (e.g., obtain/receive the action from the topic). In embodiments, the sensing function may publish the indication of the action to the topic according to a publish/subscribe messaging protocol and the actuating function may subscribe to the topic and therefore receive the indication of the action according to the publish/subscribe messaging protocol.

In some embodiments, any of the functions may be updated (e.g., by receiving updates via the function's provisioning topic). For example, a user may provide an additional specification of additional data to be obtained from the machine, an additional condition based on the additional data, and another action for another machine. For example, a user may specify that pressure data is to be collected (in addition to temperature data that is already being collected). The additional condition may be that one or more pressure measurements/values are above 100 psi. The other action may be to send to a pressure valve a command to open or to send to a pressure alarm a command to start an alarm.

The above update may be deployed to the sensing function to update the sensing function (e.g., using the provisioning topic for the connection function). Pressure data may then be obtained from the machine. Based on the pressure data, the updated sensing function determines whether the additional condition is met (pressure >100 psi). If so, then the updated sensing function provides, to another topic assigned to another actuating function, an indication of the other action for the other machine (e.g., open pressure valve or start an alarm). In a similar way, a predetermined threshold value used by a sensing function to determine whether a condition is met may be replaced with a new value. For example, an updated may indicate a new threshold value that is higher or lower (e.g., a higher or lower threshold temperature above which will cause the sensing function to provide an action to the actuating function to shut down).

In embodiments, actuating functions may also be updated. A user may provide an additional specification of one or more additional actions to be supported by an actuating function for a machine. For example, a user may specify that the actuating function may support a shut down command for the machine. The update may be deployed to the actuating function to update the actuating function (e.g., using the provisioning topic for the actuating function). The updated actuating function may then support the additional action of shutting down the machine. The corresponding sensing function may also be updated by adding shutting down as one of the actions that may be triggered (e.g., based on a condition that has been met).

Figure 4:
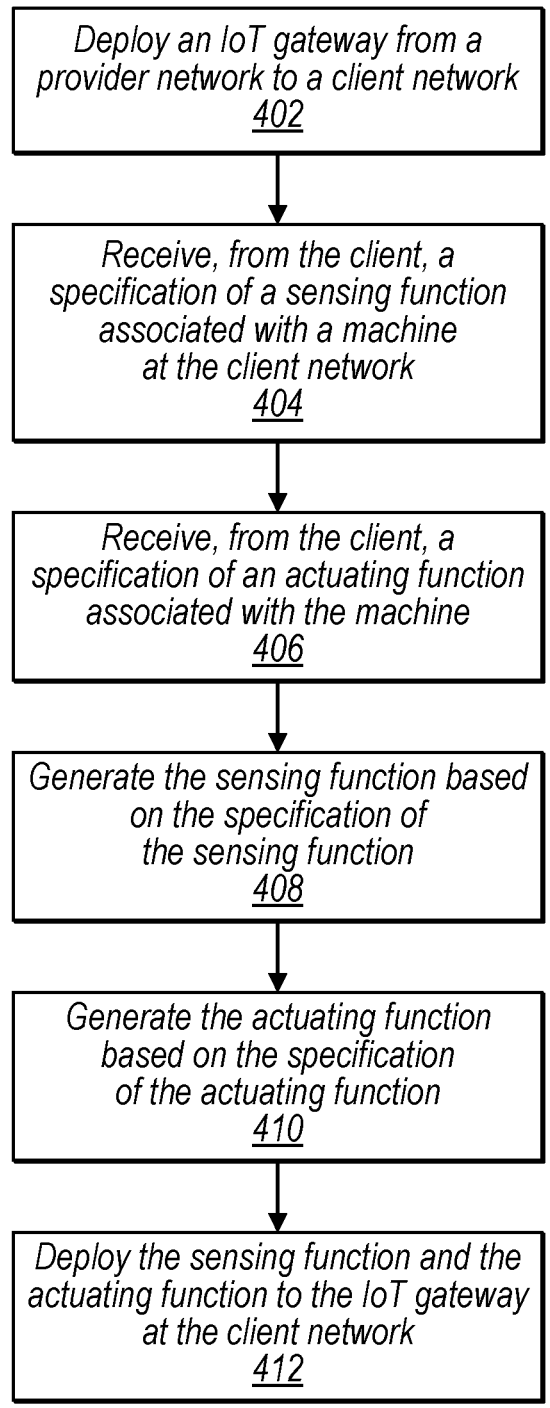
FIG. 4 is a high-level flowchart illustrating various methods and techniques to provision sensing functions and actuating functions to a client network, according to some embodiments.

FIG. 4 is a high-level flowchart illustrating various methods and techniques to provision sensing functions and actuating functions to a client network, according to some embodiments. In various embodiments, any of the functionality described for any portions of flowcharts 4 and 5 may be performed by any of the components of FIGS. 1-3 and/or 6.

Figure 5:
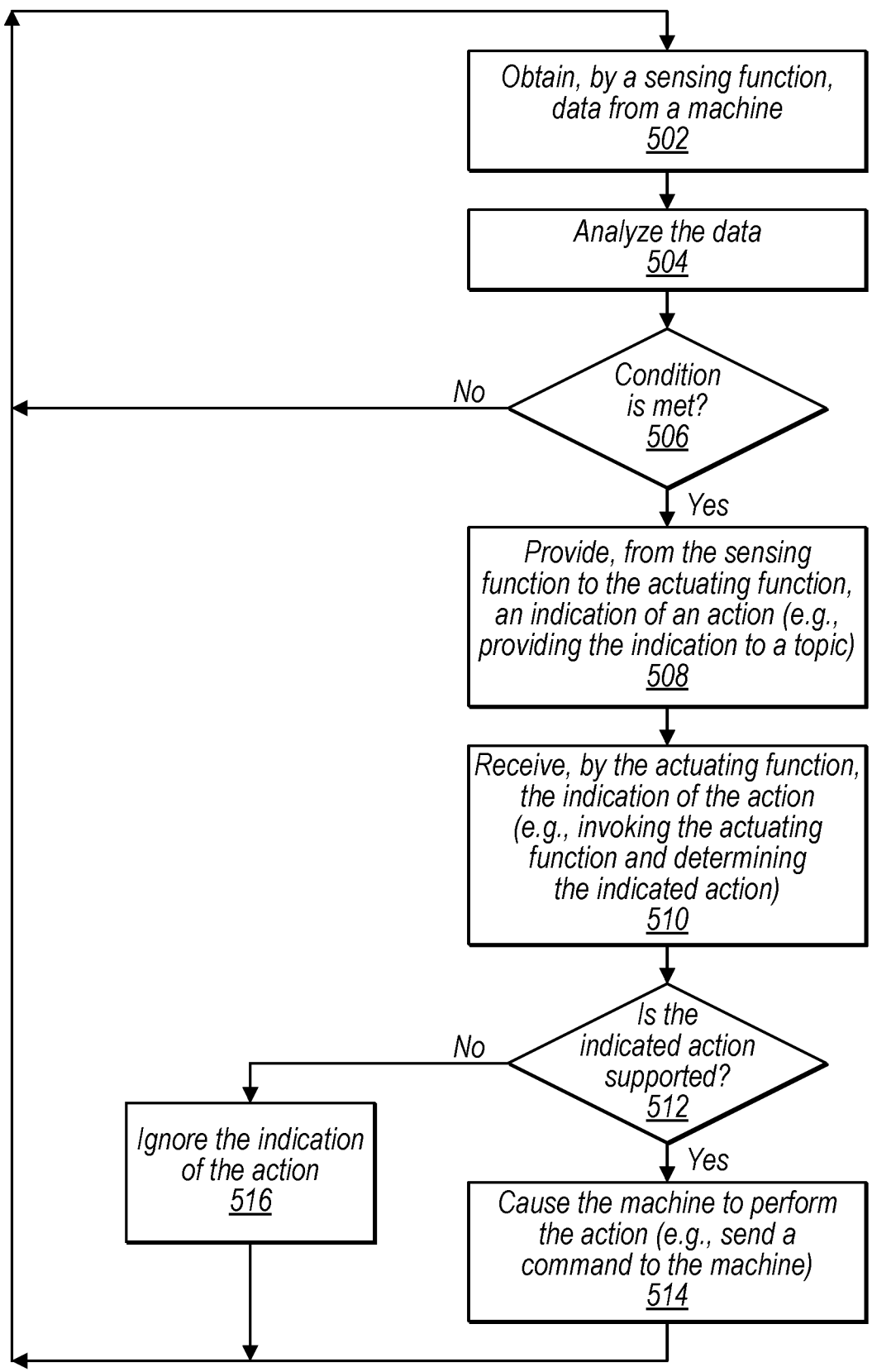
FIG. 5 is a high-level flowchart illustrating various methods and techniques to use sensing functions and actuating functions to safely implement actions for IoT devices, according to some embodiments.

These techniques, as well as the techniques discussed with regard to FIG. 5, may be implemented using any of the components or systems as described above with regard to FIGS. 1-3, as well as other types of components or systems, and thus the following discussion is not intended to be limiting as to the other types of systems that may implement the described techniques. For example, the techniques may be implemented by computing devices of a client network and/or by a service(s) of a provider network.

At block 402, a provider network deploys an IoT gateway to a client network. At block 404, the provider network receives, from the client, a specification of a sensing function associated with a machine at the client network. At block 406, the provider network receives, from the client, a specification of an actuating function associated with the machine at the client network.

At block 408, the provider network generates the sensing function based on the specification of the sensing function. At block 410, the provider network generates the actuating function based on the specification of the actuating function. At block 412, the provider network deploys the sensing function and the actuating function to the IoT gateway of the client network.

FIG. 5 is a high-level flowchart illustrating various methods and techniques to use sensing functions and actuating functions to safely implement actions for IoT devices, according to some embodiments.

At block 502, a sensing function obtains data from a machine (e.g., performing read commands). At block 504, the sensing function analyzes the data. At block 506, based on a result of analyzing the data, the sensing function determines whether a condition is met (e.g., whether one or more data values (or an average of multiple values) obtained from the machine is above a predefined threshold value). If the condition is not met, then the process returns to block 502, where the sensing function obtains additional data from the machine.

At block 506, if the condition is met, then at block 508, the sensing function provides to an actuating function an indication of an action to be performed by the machine. In embodiments, this may include providing the indication of the action to a topic that is uniquely assigned to the actuating function.

At block 510, the actuating function receives, from the sensing function, the indication of the action to be performed. In embodiments, an event listener may detect/determine that the indicated action has been provided to the topic and in response, invoke/launch the actuating function as an event-triggered function. The actuating function may determine the action based on the topic (e.g., obtain the indicated action from the topic or the event listener).

At block 512, in response to receiving the indication of the action (via the topic or other technique), the actuating function determines whether the indicated action is supported by the actuating function. For example, even though the machine may be capable of receiving 20 different commands that cause the machine to perform 20 different actions, the actuating function may only be configured to perform 15 of those commands.

If the actuating function determines that the indicated action is supported, then at block 514, the actuating function causes the machine to perform the action. For example, the actuating function may send/write a command to the machine that causes the machine to perform the action. The process then returns to block 502, where the sensing function obtains additional data from the machine.

Returning to block 512, if the actuating function determines that the indicated action is not supported for the machine (e.g., the actuating function is not configured to perform a command to cause the machine to perform the action), then at block 516, the actuating function ignores the indication of the action (and/or provides, to a destination, an indication that the action is not a supported action for the machine). The process then returns to block 502, where the sensing function obtains additional data from the machine.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the IoT gateway, IoT service, functions, and other components that implement the techniques described herein). The various methods as illustrated in the figures and described herein represent example embodiments of methods. The order of any method may be changed, and various elements may be added, reordered, combined, omitted, modified, etc.

Figure 6:
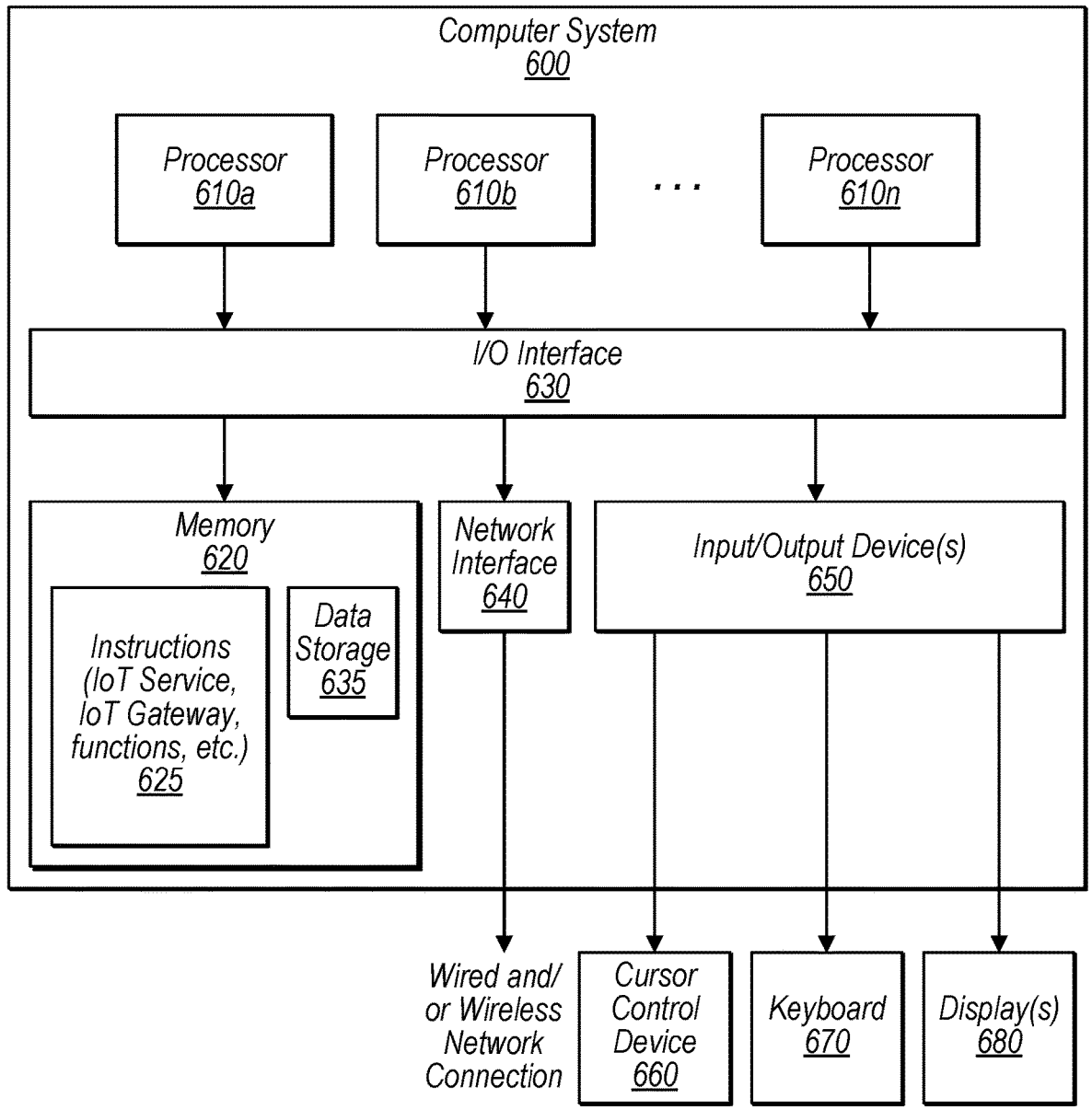
FIG. 6 is a block diagram illustrating an example computing system, according to some embodiments.

Embodiments to implement using sensing functions and actuating functions to safely implement actions for IoT devices as described herein may be executed on one or more computer systems, which may interact with various other systems or devices. One such computer system is illustrated by FIG. 6. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. Display(s) may include standard computer monitor(s) and/or other display systems, technologies or devices, in one embodiment. In some embodiments, it is contemplated that embodiments may be implemented using a single instance of computer system 600, while in other embodiments multiple such systems, or multiple nodes making up computer system 600, may host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions, in one embodiment. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 620 may store program instructions 625 and/or data accessible by processor 610, in one embodiment. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the IoT gateway, IoT service, functions, other components, etc.) are shown stored within system memory 620 as program instructions 625 and data storage 635, respectively. In other embodiments, program instructions and/or data may be received, sent or stored upon different types of computer-accessible media or on similar media separate from system memory 620 or computer system 600. A computer-accessible medium may include non-transitory storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640, in one embodiment.

In one embodiment, I/O interface 630 may be coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may allow data to be exchanged between computer system 600 and other devices attached to a network, such as other computer systems, or between nodes of computer system 600, in one embodiment. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600, in one embodiment. Multiple input/output devices 650 may be present in computer system 600 or may be distributed on various nodes of computer system 600, in one embodiment. In some embodiments, similar input/output devices may be separate from computer system 600 and may interact with one or more nodes of computer system 600 through a wired or wireless connection, such as over network interface 640.

As shown in FIG. 6, memory 620 may include program instructions 625 that implement the various embodiments of the systems as described herein, and data store 635, comprising various data accessible by program instructions 625, in one embodiment. In one embodiment, program instructions 625 may include software elements of embodiments as described herein and as illustrated in the Figures. Data storage 635 may include data that may be used in embodiments (e.g., functions, processed or unprocessed data collected from a machine, function or job specifications, etc.). In other embodiments, other or different software elements and data may be included.

Those skilled in the art will appreciate that computer system 600 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 600 may be transmitted to computer system 600 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement an IoT service for a plurality of clients, wherein the IoT service is configured to, for a given client:
provide an interface configured to:
receive, from the client, a specification of a sensing function associated with equipment at a remote network of the client, wherein the specification of the sensing function indicates at least one condition associated with the equipment and one or more actions associated with the condition; and
receive, from the client, a specification of an actuating function for the equipment, wherein the specification of the actuating function indicates one or more supported actions for the equipment;
generate the sensing function, wherein the sensing function is configured to:
obtain data from the equipment;
determine, based on the data, whether the condition has been met; and
in response to a determination that the condition has been met, provide, to the actuating function, an indication of one of the actions;
generate the actuating function, wherein the actuating function is configured to:
receive the indication of the action;
subsequent to the reception, by the actuating function, of the indication of the action provided by the sensing function, determine, by the actuating function, whether the indicated action is one of the supported actions for the equipment; and
in response to a determination that the indicated action is one of the supported actions for the equipment, cause the equipment to perform the action; and
deploy the sensing function and the actuating function to the remote network of the client.

2. The system of claim 1, wherein the actuating function is further configured to:
receive an indication of another action;
determine whether the other action is one of the supported actions for the equipment; and
in response to a determination that the other action is not one of the supported actions for the equipment, perform one or more of:
ignore the indication of the other action, or
provide, to a destination, an indication that the other action is not a supported action for the equipment.

3. The system of claim 1, wherein to generate the sensing function, the IoT service is configured to assign, to the sensing function, read only access to the equipment according to a communication protocol of the equipment, and wherein to generate the actuating function, the IoT service is configured to assign, to the actuating function, write only access to the equipment according to the communication protocol of the equipment.

4. The system of claim 1, wherein to provide, to the actuating function, the indication of one of the actions, the sensing function is further configured to:
provide the indication of the action to a topic, and
wherein to receive the indication of the action, an event listener is configured to:
in response to the indication of the action provided to the topic:
invoke the actuating function, wherein the invoked function determines, based on the topic, the indicated action.

5. The system of claim 1, wherein the IoT service is further configured to:
receive, from the client, a specification of another action associated with the condition; and
receive, from the client, a specification of another actuating function for another equipment, wherein the specification of the other actuating function indicates one or more supported actions for the other equipment;
generate an update for the sensing function, wherein the update is configured to update the sensing function to:
in response to the determination that the condition has been met, provide, to the other actuating function, an indication of the other action;
generate the actuating function, wherein the actuating function is configured to:
receive the indication of the other action;
determine whether the other action is one of the supported actions for the other equipment; and
in response to a determination that the other action is one of the supported actions for the other equipment, cause the other equipment to perform the other action; and
deploy the update and the actuating function to the remote network of the client.

6. A method, comprising:
performing, by one or more computing devices:
provisioning a sensing function to read data from equipment according to a communication protocol of the equipment;
provisioning an actuating function to write commands to the equipment according to the communication protocol;
obtaining, by the sensing function, data from the equipment according to the communication protocol;
based on the data, determining, by the sensing function, whether a condition has been met;
in response to determining, by the sensing function, that the condition has been met, providing, to the actuating function, an indication of an action for the equipment;
receiving, by the actuating function, the indication of the action for the equipment;
subsequent to receiving, by the actuating function, the indication of the action provided by the sensing function, determining, by the actuating function, whether the indicated action is a supported action for the equipment; and
in response to determining that the indicated action is a supported action for the equipment, causing the equipment to perform the action by writing a command to the equipment according to the communication protocol.

7. The method as recited in claim 6, further comprising:
receiving, by the actuating function, an indication of another action;
determining whether the other action is a supported action for the equipment; and
in response to determining that the other action is not a supported action for the equipment, performing one or more of:
ignoring the indication of the other action, or
providing, to a destination, an indication that the other action is not a supported action for the equipment.

8. The method as recited in claim 6, wherein provisioning the sensing function comprises assigning, to the sensing function, read only access to the equipment, and wherein provisioning the actuating function comprises assigning, to the actuating function, write only access to the equipment.

9. The method as recited in claim 6, further comprising:
obtaining an update for the actuating function, wherein the update indicates one or more additional actions for the equipment; and
updating the actuating function based on the obtained update, wherein the one or more additional actions for the equipment are supported by the updated actuating function.

10. The method as recited in claim 6, wherein the condition comprises one or more values of the data exceeding a predetermined threshold value, and wherein determining, by the sensing function, that the condition has been met comprises:
determining, by the sensing function, that the one or more values of the data exceed the predetermined threshold value.

11. The method as recited in claim 10, further comprising:
obtaining an update for the sensing function, wherein the update indicates a new predetermined threshold value; and
updating the sensing function based on the obtained update, wherein the predetermined threshold value is replaced by the new predetermined threshold value.

12. The method as recited in claim 6, wherein
providing, to the actuating function, the indication of the action for the equipment comprises:
providing the indication of the action to a topic; and
wherein receiving, by the actuating function, the indication of the action for the equipment comprises:
in response to the providing of the indication of the action to the topic:
invoking, by an event listener, the actuating function, wherein the actuating function determines, based on the topic, the indicated action.

13. The method as recited in claim 12, further comprising:
in response to determining, by the sensing function, that the condition has been met, providing an indication of another action to another topic;
receiving, by another actuating function, the indication of the other action; and
in response to determining that the other action is a supported action for another equipment, causing the other equipment to perform the other action by writing a command to the other equipment according to a different communication protocol.

14. The method as recited in claim 6, further comprising:
obtaining, by the sensing function, additional data from the equipment according to the communication protocol;

based on the additional data, determining, by the sensing function, whether an additional condition has been met; and in response to determining, by the sensing function, that the additional condition has been met, providing, to another actuating function, an indication of another action for another equipment.

15. One or more non-transitory computer-accessible storage media storing program instructions that when executed on or across one or more processors of a computing device cause the one or more processors to:

provision a sensing function, received from an IoT service of a provider network, wherein the sensing function is provisioned to:
  obtain data from equipment;
  determine, based on the data, whether a condition has been met; and
  in response to a determination that the condition has been met, provide, to a topic, an indication of an action; and provision the actuating function, received from the IoT service, wherein the actuating function is provisioned to, subsequent to invocation of the actuating function in response to the indication of the action provided to the topic:
  determine, based on the providing of the indication of the action to the topic, the indicated action;
  subsequent to the determination, by the actuating function, of the indicated action based on the providing of the indication of the action by the sensing function, determine, by the actuating function, whether the determined indicated action is a supported action for the equipment; and
  in response to a determination that the indicated action is a supported action for the equipment, cause the equipment to perform the action.

16. The one or more storage media as recited in claim 15, further comprising program instructions that when executed on or across the one or more processors further cause the one or more processors to provision the actuating function to, subsequent to invocation of the actuating function in response to an indication of another action provided to the topic:
  determine, based on the topic, the other indicated action;
  determine whether the other action is a supported action for the equipment; and
  in response to a determination that the other action is not a supported action for the equipment, perform one or more of:
    ignore the indication of the other action, or
    provide, to a destination, an indication that the other action is not a supported action for the equipment.

17. The one or more storage media as recited in claim 15, wherein the sensing function is provisioned for read only access to the equipment, and wherein the actuating function is provisioned for write only access to the equipment.

18. The one or more storage media as recited in claim 15, further comprising program instructions that when executed on or across the one or more processors further cause the one or more processors to:
  receive, from the IoT service, an update for the actuating function, wherein the update indicates one or more additional actions for the equipment; and
  update the actuating function based on the received update, wherein the one or more additional actions for the equipment are supported by the updated actuating function.

19. The one or more storage media as recited in claim 15, wherein to receive, from the IoT service, an update for the actuating function, the program instructions when executed on or across the one or more processors further cause the one or more processors to:
  obtain the update from the IoT service using a function provisioning topic reserved for the sensing function.

20. The one or more storage media as recited in claim 15, further comprising program instructions that when executed on or across the one or more processors further cause the one or more processors to provision the actuating function to:
  receive, from the IoT service, an update for the sensing function, wherein the update indicates additional data to be obtained from the equipment, an additional condition based on the additional data, and another action for another equipment;
  update the sensing function based on the received update;
  obtain, by the updated sensing function, the additional data from the equipment;
  based on the additional data, determine, by the updated sensing function, whether the additional condition has been met; and
  in response to a determination, by the updated sensing function, that the additional condition has been met, provide, to another topic assigned to another actuating function, an indication of the other action for the other equipment.

* * * * *